(12) United States Patent
Dicker et al.

(10) Patent No.: US 12,516,349 B2
(45) Date of Patent: Jan. 6, 2026

(54) METHODS AND SYSTEMS FOR MANUFACTURING VIRAL VECTORS

(71) Applicant: Regeneron Pharmaceuticals, Inc., Tarrytown, NY (US)

(72) Inventors: Stephen Michael Dicker, Wakefield, MA (US); Julia Ruth Deuel, Melrose, MA (US); Vimal H. Vaidya, Schnecksville, PA (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 1076 days.

(21) Appl. No.: 17/425,309

(22) PCT Filed: Jan. 22, 2020

(86) PCT No.: PCT/US2020/014668
§ 371 (c)(1),
(2) Date: Jul. 22, 2021

(87) PCT Pub. No.: WO2020/154445
PCT Pub. Date: Jul. 30, 2020

(65) Prior Publication Data
US 2022/0106610 A1    Apr. 7, 2022

Related U.S. Application Data

(60) Provisional application No. 62/795,513, filed on Jan. 22, 2019.

(51) Int. Cl.
*C12N 15/86* (2006.01)
*G01N 15/14* (2006.01)
*G01N 30/74* (2006.01)

(52) U.S. Cl.
CPC ............ *C12N 15/86* (2013.01); *G01N 15/14* (2013.01); *G01N 30/74* (2013.01); *C12N 2740/15043* (2013.01); *C12N 2740/15051* (2013.01)

(58) Field of Classification Search
CPC .................................................. C12N 15/86
See application file for complete search history.

(56) References Cited

U.S. PATENT DOCUMENTS

| 6,316,185 B1 * | 11/2001 | Saifer | G01N 15/0205 435/235.1 |
| 2003/0199100 A1 | 10/2003 | Wick | |
| 2014/0302158 A1 * | 10/2014 | Cabrera | A61K 39/145 435/69.3 |
| 2016/0033470 A1 * | 2/2016 | Reed | G01N 33/442 526/60 |
| 2018/0072777 A1 | 3/2018 | Rutten et al. | |
| 2018/0094280 A1 | 4/2018 | Kutner et al. | |
| 2018/0119110 A1 | 5/2018 | Schlegl et al. | |
| 2021/0154231 A1 | 5/2021 | Li et al. | |

FOREIGN PATENT DOCUMENTS

| EP | 2765138 A2 | 8/2014 |
| WO | 2019/070424 A1 | 4/2019 |

OTHER PUBLICATIONS

Buclez, P.-O., et al., 2016, Rapid, scalable, and low-cost purification of recombinant adeno-associated virus produced by baculovirus expression vector system, Mol. Ther. Meth. Clin. Develop. 3:16035, 1-10.*
Aguilar et al., At-line multi-angle light scattering detector for faster process development in enveloped virus-like particle purification. J Sep Sci. Aug. 2019;42(16):2640-2649.
Chen et al., The potential of adoptive transfer of gamma 9 delta 2 T cells to enhance blinatumomab's antitumor activity against B-cell malignancy. Sci Rep. Jun. 11, 2021;11(1):12398, 15 pages.
Guo et al., TIM-3 blockade combined with bispecific antibody MT110 enhances the anti-tumor effect of gamma delta T cells. Cancer Immunol Immunother. Dec. 2020;69(12):2571-2587.
Hoh et al., The activity of gamma delta T cells against paediatric liver tumour cells and spheroids in cell culture. Liver Int. Jan. 2013;33(1):127-36.
Oberg et al., Bispecific antibodies enhance tumor-infiltrating T cell cytotoxicity against autologous HER-2-expressing high-grade ovarian tumors. J Leukoc Biol. Jun. 2020; 107(6):1081-1095.
Oberg et al., Novel bispecific antibodies increase gamma delta T-cell cytotoxicity against pancreatic cancer cells. Cancer Res. Mar. 1, 2014;74(5):1349-60.
Opitz et al., Sulfated membrane adsorbers for economic pseudo-affinity capture of influenza virus particles. Biotechnol Bioeng. Aug. 15, 2009; 103(6):1144-54.
Patterson et al., Virus-like nanoreactors: programmed encapsulation of the thermostable CelB glycosidase inside the P22 capsid. Soft Matter. 2012;8(39):10158-10166.
Wickramasinghe et al., Tangential flow microfiltration and ultrafiltration for human influenza A virus concentration and purification. Biotechnol Bioeng. Oct. 20, 2005;92(2):199-208.
Yazdanifar et al., gamma delta T Cells: The Ideal Tool for Cancer Immunotherapy. Cells. May 24, 2020;9(5):1305, 26 pages.
International Search Report and Written Opinion for Application No. PCT/US2020/014668, dated Apr. 14, 2020, 20 pages.
International Search Report and Written Opinion for Application No. PCT/US2023/065437, dated Jul. 21, 2023, 11 pages.

* cited by examiner

*Primary Examiner* — Jeffrey S Parkin
(74) *Attorney, Agent, or Firm* — McCarter & English, LLP; Marcie B. Clarke; Dylan M. Blumenthal

(57) ABSTRACT

Disclosed herein are methods and systems for manufacturing viral vectors (e.g., lentiviral vectors) using a static light scattering device in-line with a manufacturing process.

8 Claims, 6 Drawing Sheets

METHODS AND SYSTEMS FOR MANUFACTURING VIRAL VECTORS

CROSS REFERENCE TO RELATED APPLICATIONS

This application is a National Stage application under 35 U.S.C. § 371 of International Application No. PCT/US2020/014668, filed Jan. 22, 2020, which claims the benefit under 35 U.S.C. § 119 (e) of U.S. Provisional Application No. 62/795,513, filed Jan. 22, 2019, which is incorporated by reference herein in its entirety.

BACKGROUND OF THE INVENTION

Gene therapy using viral vectors is an area that has generated significant interest. However, the ability to efficiently manufacture large quantities of viral vectors continues to be a problem. There is currently no in-line process analytical technology (PAT) solution for detecting or quantifying viral vectors during the manufacturing process. There is also no in-line process for controlling separation of non-infectious particles from infectious particles during the manufacturing process. Quantification and identification of viral vectors typically requires lengthy assays, which do not allow real time decision-making during the manufacturing process. Additionally, there is currently no in-line solution to control separation of intact viral vector particles from their process specific impurities, such as exosomes. There is a need for a process that allows detecting infectious viral particles, and enabling the separation of these particles from impurities, in real time.

SUMMARY OF THE INVENTION

Disclosed herein are methods for manufacturing viral vectors. The methods comprise using a static light scattering device (e.g., a multi-angle light scattering (MALS)) device in-line with a manufacturing process to control and/or automate a unit operation in the manufacturing process.

In some embodiments, a MALS device is used to control and/or automate one or more unit operations (e.g., two, three, four, five, or six unit operations) in the manufacturing process. In some embodiments, a MALS device is used to control each unit operation in the manufacturing process.

In some embodiments, the unit is a separation unit (e.g., a chromatography unit, a tangential flow filtration unit, a normal flow filtration unit, and/or an ultrafiltration unit). In some embodiments, the unit is a filtration, clarification, purification, concentration, formulation, and/or fill unit.

Also disclosed herein are methods for detecting viral particles. The methods comprise using a static light scattering device (e.g., a MALS device) in-line with a manufacturing process to detect the viral particles produced during the manufacturing process.

In some embodiments, a MALS device is used in-line with chromatography and/or filtration (e.g., tangential flow filtration, normal flow filtration, and/or ultrafiltration) during the manufacturing process to detect the viral particles. In some embodiments, a first MALS device is used in-line with chromatography and a second MALS device is used in-line with filtration.

In some embodiments, the methods for detecting viral particles further comprise purifying the viral particles. In some embodiments, a MALS device automates the separation of the viral particles from impurities based on particle size. The particle size may be measured as the radius or diameter of the particle.

Disclosed herein are viral vector manufacturing processes. The methods comprise clarifying viral particles harvested from host cells, separating the viral particles from impurities, filtering the viral particles, and concentrating the viral particles, wherein the manufacturing process is performed in-line with one or more static light scattering devices (e.g., MALS devices).

In some embodiments, the viral particles are separated using chromatography and/or filtration in-line with a MALS device. In some embodiments the viral particles are separated from impurities based on particle size. Particle size may be measured using a MALS device. In some embodiments, the viral particles are filtered and concentrated using tangential flow filtration in-line with a MALS device. In certain embodiments, a MALS device determines real-time concentration of the viral particles in solution (e.g., viral particles/mL). In some embodiments, the one or more MALS devices are used in-line with separation, filtration, concentration, clarification, purification, and/or formulation processes.

Also disclosed herein are methods for manufacturing viral vectors. The methods comprise initiating a viral vector manufacturing process, detecting the presence of viral particles using a static light scattering device (e.g., a MALS device) in-line with the manufacturing process, and purifying the viral particles.

In some embodiments, a MALS device is used in-line with chromatography and/or filtration (e.g., tangential flow filtration, normal flow filtration, and/or ultrafiltration) during the manufacturing process to detect the viral particles. In some embodiments, a first MALS device is used in-line with chromatography and a second MALS device is used in-line with filtration.

In some embodiments, a MALS device is used in-line with filtration to control one or more unit operations to purify the viral particles from impurities based on particle size. The particle size may be measured as the radius or diameter of the particle by a MALS device. In some embodiments, the filtration unit is a normal flow filtration unit. In some embodiments, a second filtration unit is used in-line with a MALS device, and wherein the second filtration unit is an ultrafiltration unit.

In some embodiments, a first MALS device is used to detect the presence of viral particles and a second MALS device is used to control one or more unit operations to purify the viral particles. In some embodiments, the methods for manufacturing viral vectors further comprise concentrating the viral particles.

Also disclosed herein are methods for removing impurities in a viral vector manufacturing process. The methods comprise separating a solution containing viral particles and impurities using chromatography and/or filtration in-line with a static light scattering device (e.g., a MALS device), wherein the static light scattering device separates the viral particles from the impurities based on particle size. In particular embodiments, the MALS device detects the difference between viral particles and impurities based on size and thereby controls the separation device (e.g., signal from MALS to chromatography skid controls viral particle collection and sends impurities to waste).

In some embodiments, a MALS device is used in-line with a chromatography unit. In some embodiments, a MALS device is used in-line with a tangential flow filtration unit, a normal flow filtration unit, and/or an ultrafiltration unit. In some embodiments, a first MALS device is used in-line with a chromatography unit and a second MALS device is used in-line with a filtration unit.

In some embodiments, the methods for removing impurities in a viral vector manufacturing process further comprise purifying the viral particles. In some embodiments, a MALS device is used in-line with a filtration unit (e.g., a normal flow filtration unit) to control purification of the viral particles from impurities based on particle size. In some embodiments, a second filtration unit (e.g., an ultrafiltration unit) is used in-line with a MALS device. In some embodiments, a first MALS device is used to enable viral particle separations from impurities and a second MALS device is used to control purification of the viral particles. In some embodiments the methods for removing impurities in a viral vector manufacturing process further comprise concentrating the viral particles. In some embodiments, the particle size is measured as the radius or diameter of the particle.

Disclosed herein are methods for increasing the recovery of infectious viral particles in a viral vector manufacturing process. The methods comprise separating infectious viral particles from impurities in a solution using chromatography and/or filtration in-line with a static light scattering device (e.g., a MALS device), wherein the static light scattering device separates the infectious viral particles from the impurities based on particle size.

In some embodiments, a MALS device is used in-line with chromatography. In some embodiments, a MALS device is used in-line with tangential flow filtration, normal flow filtration, and/or ultrafiltration. In some embodiments, a first MALS device is used in-line with chromatography and a second MALS device is used in-line with filtration.

In some embodiments the methods for increasing the recovery of infectious viral particles in a viral vector manufacturing process further comprise concentrating the infectious viral particles. In some embodiments, the methods for increasing the recovery of infectious viral particles in a viral vector manufacturing process further comprise purifying the infectious viral particles. In some embodiments, a MALS device is used in-line with filtration (e.g., normal flow filtration) to control the purification of the infectious viral particles from the impurities based on particle size. In some embodiments, a second filtration (e.g., ultrafiltration) is used in-line with the MALS device.

In some embodiments, a first MALS device is used to separate the infectious viral particles from the impurities and a second MALS device detects and controls unit operations related to aspects of the manufacturing process to purify the infectious viral particles. In some embodiments, the particle size is measured as the radius or diameter of the particle.

Also disclosed herein are methods for concentrating viral particles in a viral vector manufacturing process. The methods comprise filtering a solution comprising viral particles using tangential flow filtration in-line with a static light scattering device (e.g., a MALS device); wherein the static light scattering device determines the real-time concentration of the viral particles in solution and automates the filtering of the solution until the real-time concentration is substantially equal to a target concentration of the viral particles in the solution.

In some embodiments, the methods for concentrating viral particles in a viral vector manufacturing process further comprise clarifying the viral particles and/or purifying the viral particles. In some embodiments, a MALS device is used in-line with a filtration unit (e.g., a normal flow filtration unit) to control purification of viral particles from impurities based on particle size. In some aspects, the particle size is measured as the radius or diameter of the particle. In some embodiments, a second filtration unit (e.g., an ultrafiltration unit) is used in-line with a MALS device. In some embodiments, a first MALS device is used to control concentration of viral particles and a second MALS device detects and controls unit operations related to control aspects of the manufacturing process to purify the viral particles.

Disclosed herein are methods for controlling a unit operation in a viral manufacturing process. The methods comprise using a static light scattering device (e.g., a MALS device) in-line with the manufacturing process to detect turbidity in a solution comprising viral particles and thereby control the unit operation.

Also disclosed herein are systems for manufacturing viral vectors. The systems comprise a static light scattering device (e.g., a MALS device) in-line with the manufacturing process.

In various embodiments disclosed herein, the viral vectors or viral particles are selected from the group consisting of adeno-associated virus (AAV), retrovirus, herpes simplex virus, adenovirus, and vaccinia virus vectors or particles. In certain embodiments, the viral vectors or viral particles are lentiviral vectors or particles.

In some embodiments, a MALS device is connected to one or more units. In some embodiments, a MALS device is connected to a separation unit. In some embodiments, a MALS device is connected to a chromatography unit. In some embodiments, a MALS device is connected to a filtration unit (e.g., a tangential flow filtration unit, a normal flow filtration unit, and/or an ultrafiltration unit). In some embodiments, a MALS device is connected to a concentration unit. In some embodiments, a MALS device is connected to a clarification unit. In some embodiments, a MALS device is connected to a purification unit.

In some embodiments, the system comprises one or more MALS device (e.g., two, three, four, five, or six MALS devices). In some embodiments, a first MALS device is connected to a separation unit. In some embodiments, a first MALS device is connected to a chromatography unit. In some embodiments, a second MALS device is connected to a filtration unit (e.g., a tangential flow filtration unit, a normal flow filtration unit, and/or an ultrafiltration unit). In some embodiments, a third MALS device is connected to a concentration unit. In some embodiments, a fourth MALS device is connected to a clarification unit. In some embodiments, a fifth MALS device is connected to a purification unit.

DETAILED DESCRIPTION OF THE INVENTION

Figure 1:
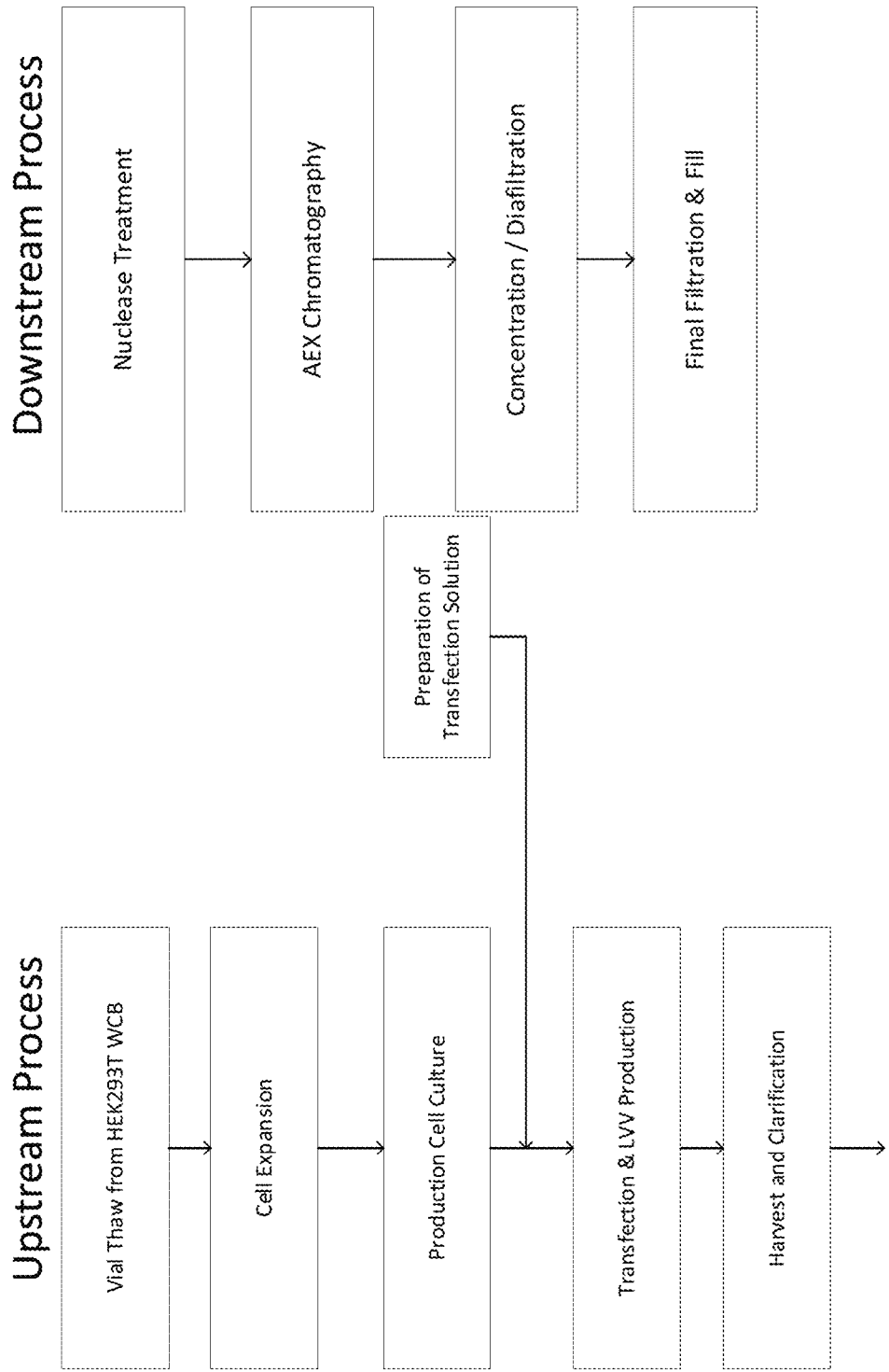
FIG. 1 provides a flow chart of a viral vector manufacturing process.

Disclosed herein are methods for manufacturing viral vectors. In some embodiments, the methods comprise using a static light scattering device (e.g., multi-angle light scattering (MALS) device) in-line with a manufacturing process. Also disclosed herein are systems for manufacturing viral vectors (e.g., retrovirus vectors, lentivirus vectors, adenovirus vectors, adeno-associated virus (AAV) vectors, vaccinia virus vectors, and herpes simplex virus (HSV) vectors). In some embodiments the systems comprise a static light scattering device (e.g., MALS device) in-line with a manufacturing process. In particular embodiments, one or more MALS devices is used in-line with a manufacturing process to control and/or automate one or more unit operations in the viral vector manufacturing process.

Definitions

Prior to setting forth this disclosure in more detail, it may be helpful to an understanding thereof to provide definitions of certain terms to be used herein.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred embodiments of compositions, methods and materials are described herein. For the purposes of the present invention, the following terms are defined below.

The articles "a," "an," and "the" are used herein to refer to one or to more than one (i.e., to at least one, or to one or more) of the grammatical object of the article. By way of example, "an element" means one element or one or more elements.

The use of the alternative (e.g., "or") should be understood to mean either one, both, or any combination thereof of the alternatives.

The term "and/or" should be understood to mean either one, or both of the alternatives.

As used herein, the term "about" or "approximately" refers to a quantity, level, value, number, frequency, percentage, dimension, size, amount, weight or length that varies by as much as 30, 25, 20, 25, 10, 9, 8, 7, 6, 5, 4, 3, 2 or 1% to a reference quantity, level, value, number, frequency, percentage, dimension, size, amount, weight or length. In certain embodiments, the terms "about" or "approximately" when preceding a numerical value indicates the value plus or minus a range of 15%, 10%, 5%, or 1%.

As used herein, the term "substantially" refers to a quantity, level, value, number, frequency, percentage, dimension, size, amount, weight or length that is 80%, 85%, 90%, 91%, 92%, 93%, 94%, 95%, 96%, 97%, 98%, 99% or higher compared to a reference quantity, level, value, number, frequency, percentage, dimension, size, amount, weight or length. In one embodiment, "substantially the same" refers to a quantity, level, value, number, frequency, percentage, dimension, size, amount, weight or length that produces an effect, e.g., a physiological effect, that is approximately the same as a reference quantity, level, value, number, frequency, percentage, dimension, size, amount, weight or length.

Throughout this specification, unless the context requires otherwise, the words "comprise", "comprises" and "comprising" will be understood to imply the inclusion of a stated step or element or group of steps or elements but not the exclusion of any other step or element or group of steps or elements. As used herein, the terms "include" and "comprise" are used synonymously. By "consisting of is meant including, and limited to, whatever follows the phrase "consisting of." Thus, the phrase "consisting of indicates that the listed elements are required or mandatory, and that no other elements may be present. By "consisting essentially of is meant including any elements listed after the phrase, and limited to other elements that do not interfere with or contribute to the activity or action specified in the disclosure for the listed elements. Thus, the phrase "consisting essentially of indicates that the listed elements are required or mandatory, but that no other elements are present that materially affect the activity or action of the listed elements.

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment.

Furthermore, the particular features, structures, or characteristics may be combined in any suitable manner in one or more embodiments. It is also understood that the positive recitation of a feature in one embodiment, serves as a basis for excluding the feature in a particular embodiment.

As used herein, the term "lentivirus" refers to a group (or genus) of complex retroviruses. Illustrative lentiviruses include, but are not limited to: HIV (human immunodeficiency virus; including HIV type 1, and HIV type 2); visna-maedi virus (VMV) virus; the caprine arthritis-encephalitis virus (CAEV); equine infectious anemia virus (EIAV); feline immunodeficiency virus (FIV); bovine immune deficiency virus (BIV); and simian immunodeficiency virus (SIV). In one embodiment, HIV based vector backbones (i.e., HIV cis-acting sequence elements) are preferred.

Retroviral vectors, and more particularly, lentiviral vectors, may be used in practicing the present invention. Accordingly, the term "retrovirus" or "retroviral vector," as used herein is meant to include "lentivirus" and "lentiviral vectors" respectively.

The term "vector" is used herein to refer to a viral particle used to transfer a polynucleotide (e.g., encoding a gene or transgene of interest) to a cell (i.e., a viral vector). Useful viral vectors include, e.g., replication defective retroviruses and lentiviruses.

As will be evident to one of skill in the art, the term "viral vector" is widely used to refer to a viral particle that mediates nucleic acid transfer. Viral particles will typically include various viral components and sometimes also host cell components in addition to nucleic acid(s). Illustrative viral vectors includes, but are not limited to, retrovirus vectors, lentivirus vectors, adenovirus vectors, adeno-associated virus (AAV) vectors, vaccinia virus vectors, and herpes simplex virus (HSV) vectors.

The term viral vector may refer either to a virus or viral particle capable of transferring a nucleic acid into a cell. Viral vectors contain structural and/or functional genetic elements that are primarily derived from a virus. The term "retroviral vector" refers to a viral vector and functional genetic elements, or portions thereof, that are primarily derived from a retrovirus. The term "lentiviral vector" refers to a retroviral vector containing structural and functional genetic elements, or portions thereof, including LTRs that are primarily derived from a lentivirus. The term "hybrid" refers to a vector containing both retroviral, e.g., lentiviral, sequences and non-lentiviral viral sequences. In one embodiment, a hybrid vector refers to a vector comprising retroviral, e.g., lentiviral, sequences for reverse transcription, replication, integration and/or packaging.

In particular embodiments, the terms "lentiviral vector" and "lentiviral expression vector" may be used to refer to infectious lentiviral particles. Where reference is made herein to elements such as cloning sites, promoters, regulatory elements, heterologous nucleic acids, etc., it is to be understood that the sequences of these elements are present in RNA form in the lentiviral particles of the invention.

The terms "decrease", "reduced", "reduction", "decrease" or "inhibit" are all used herein generally to mean a decrease by a statistically significant amount. However, for avoidance of doubt, "reduced", "reduction" or "decrease" or "inhibit" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample), or any decrease between 10-100% as compared to a reference level.

The terms "increased", "increase" or "enhance" or "activate" are all used herein to generally mean an increase by a statically significant amount; for the avoidance of any doubt, the terms "increased", "increase" or "enhance" or "activate" means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The term "statistically significant" or "significantly" refers to statistical significance and generally means a two standard deviation (2SD) below normal, or lower, concentration of the marker. The term refers to statistical evidence that there is a difference. It is defined as the probability of making a decision to reject the null hypothesis when the null hypothesis is actually true. The decision is often made using the p-value.

Additional definitions are set forth throughout this disclosure.

In the following description, certain specific details are set forth in order to provide a thorough understanding of various illustrative embodiments of the invention contemplated herein. However, one skilled in the art will understand that particular illustrative embodiments may be practiced without these details.

System for Manufacturing Viral Vectors

In some embodiments a system for manufacturing viral vectors comprises one or more static light scattering devices in-line with a manufacturing process. In certain embodiments a system for manufacturing viral vectors comprises one or more multi-angle light scattering devices (also referred to herein as multi-angle static light scattering devices) in-line with a manufacturing process. In some embodiments a system for manufacturing viral vectors comprises two, three, four, five, or six static light scattering devices in-line with a manufacturing process. In some aspects, a static light scattering device is used in-line with one or more manufacturing units. A static light scattering device may be connected to one or more manufacturing operation units. In some aspects a single static light scattering device is connected to an operation unit. In some aspects a single static light scattering device is connected to multiple operation units. An operation unit may include a separation unit. In some aspects a separation unit includes, a filtration unit, a concentration unit, a clarification unit, a purification unit, and/or a formulation unit. In some aspects a separation unit is a chromatography unit. In certain aspects a chromatography unit is an ion-exchange chromatography unit (e.g., anion exchange chromatography unit). In certain aspects a chromatography unit is an affinity chromatography unit (e.g., heparin affinity chromatography unit, avidin-biotin affinity chromatography, and/or immobilized metal affinity chromatography (IMAC) unit). In certain aspects a chromatography unit is a size exclusion chromatography unit. In some aspects a separation unit is a filtration unit. In certain aspects a filtration unit is a tangential flow filtration unit. In certain aspects a filtration unit is a normal flow filtration unit. In certain aspects a filtration unit is an ultrafiltration unit.

Any static light scattering device may be used in the embodiments of the invention. Examples of static light scattering devices may be found at wyatt.com, incorporated herein by reference. In some aspects a static light scattering device has one or more detectors or angles. The number of detectors and/or angles desired for a static light scattering device may depend on the use of the device. In one non-limiting example, a static light scattering device for measuring the size of a particle may have 3 or more detectors (e.g., 3, 7, 8, 9, 18, 20, or 21 detectors). In other non-limiting examples, a static light scattering device for use in measuring concentration or turbidity may have a single detector. A static light scattering device may be selected based on its intended use, e.g., measuring particle size or concentration, and if measuring particle size, based on the particle size being measured (e.g., larger particles require progressively more detectors). In certain embodiments a static light scattering device is a multi-angle light scattering (MALS) device.

A static light scattering device may be used to measure the radius and/or diameter of viral vectors. The static light scattering device measures the root-mean-square radius of viral vectors, which may be used to calculate the geometric radius for spherical particles. The concentration of manufactured viral vectors may be determined from the calculated geometric radius and by the light scattering signal. A static light scattering device may be used with a viral vector manufacturing system to measure the presence and/or size of viral vectors and/or measure the concentration of viral vectors in solution.

A static light scattering device used in-line with a manufacturing process may perform one or more actions. In some embodiments a static light scattering device is used in-line with a manufacturing process to control a unit operation in the manufacturing process. In some embodiments a static light scattering device is used in-line with a manufacturing process to detect viral particles produced during the manufacturing process. In some embodiments a static light scattering device is used in-line with a manufacturing process to separate viral particles (e.g., infectious viral particles) from impurities. In some embodiments a static light scattering device is used in-line with a manufacturing process to determine the concentration (e.g., real time concentration) of viral particles in solution. In some embodiments a static light scattering device is used in-line with a manufacturing process to detect turbidity in a solution comprising viral particles.

Methods of Manufacturing Viral Vectors

The manufacture of viral vectors may include an upstream process and a downstream process. In some aspects, the upstream process comprises various unit operations, stages or phases including, but not limited to, cell expansion, cell culture, transfection, production, and harvest. In some aspects, the downstream process comprises one or more unit operations, stages or phases including, but not limited to, separation, filtration, concentration, clarification, purification, formulation, and filling. In some aspects viral vectors manufactured with the methods contemplated herein include, but are not limited to retrovirus vectors, lentivirus vectors, adenovirus vectors, adeno-associated virus (AAV) vectors, vaccinia virus vectors, and herpes simplex virus (HSV) vectors. In certain aspects, lentiviral vectors are manufactured.

In some embodiments one or more static light scattering devices are used in-line with a viral vector manufacturing process. In certain embodiments one or more multi-angle light scattering devices are used in-line with a viral vector manufacturing process. In some aspects a single static light scattering device is used in-line with one or more stages of the manufacturing process. In some aspects a single static light scattering device is used in-line with each stage of the manufacturing process. In some aspects a single static light scattering device is used in-line with multiple stages of the manufacturing process. The stages of the manufacturing process may include harvest, separation, filtration, clarification, purification, concentration, formulation, and fill.

In some embodiments a static light scattering device is used in-line with a separation process. In some embodiments a static light scattering device is used in-line with a filtration process. In some embodiments a static light scattering device is used in-line with a clarification process. In some embodiments a static light scattering device is used in-line with a purification process. In some embodiments a static light scattering device is used in-line with a concentration process. In some embodiments a static light scattering device is used in-line with a formulation process. In some embodiments a static light scattering device is used in-line with multiple processes selected from the group consisting of a separation process, a filtration process, a clarification process, a purification process, a concentration process, a formulation process, and a fill process. In some aspects each process comprises multiple phases. For example, a filtration process may comprise a first filtration (e.g., using normal flow filtration) and a second filtration (e.g., using ultrafiltration).

In some aspects one or more static light scattering devices are used in-line with chromatography (e.g., ion-exchange chromatography, affinity chromatography, and/or size exclusion chromatography), filtration (e.g., tangential flow filtration, normal flow filtration, and/or ultrafiltration) and/or centrifugation. In some embodiments a static light scattering device is used in-line with chromatography. In some embodiments a static light scattering device is used in-line with filtration. In some embodiments a static light scattering device is used in-line with chromatography and filtration. In some embodiments a first static light scattering device is used in-line with chromatography and a second static light scattering device is used in-line with filtration.

In some embodiments a static light scattering device used in-line with a manufacturing process measures the presence and/or size of viral vectors. In some aspects a static light scattering device used in-line with a manufacturing process measures the concentration of viral vectors in solution. In some embodiments a static light scattering device used in-line with a manufacturing process triggers automation of the manufacturing process. In some aspects the automation of the manufacturing process based on measured particle size results in the purification of the manufactured viral vectors. For example, viral particles may be purified during the manufacturing process based on the measured particle size. In some aspects the automation of the manufacturing process based on the measured concentration of viral vectors in solution results in the stopping of viral vector production. For example, once a specific concentration of viral particles is detected in solution, manufacture of the viral vectors may cease.

In some embodiments a static light scattering device used in-line with a manufacturing process controls the separation of components in a solution containing viral particles and impurities. In some aspects impurities in the solution are product related impurities or process related impurities. Product related impurities may include inactive vector forms, viral aggregates, soluble envelope proteins, free viral components, broken/disassembled particles, and/or env(−) particles. Process related impurities may include impurities derived from culture medium (e.g., proteins, peptides, amino acids; lipids, phospholipids; salts, buffers; sugars (i.e., glucose); trace elements, vitamins; serum/hydrolysate additives), host cells (e.g., cell debris, vesicles; host proteins; host nucleic acids; proteoglycans), production (e.g., polyethilenimine (PEI); plasmid DNA; small molecules; adventitious agents, endotoxins) and/or purification (e.g., nucleases; buffers; detergents; extractables, leachables).

A viral vector manufacturing process may comprise multiple phases or processes for separating viral vectors from impurities and purifying the viral vectors. For example, a manufacturing process may comprise multiple (e.g. 5-7) downstream processing steps for obtaining viral vectors having a desired concentration and formulation, including a clarification step, a concentration/purification step, a nucleic acid digestion step, a formulation step, a final filtration step, and a fill step.

In some embodiments a viral vector manufacturing process comprises a clarification process. The clarification process may be used to eliminate producer cells and cell debris from a solution comprising viral vectors. In some aspects the clarification process comprises centrifugation, filtration, and/or chromatography. In some aspects a static light scattering device is used in-line with the clarification process (e.g., used in-line with chromatography, filtration, and/or centrifugation).

In some embodiments a viral vector manufacturing process comprises a concentration and/or purification process. The concentration and/or purification process may be used to separate out impurities from the solution of viral particles. In some aspects the concentration and/or purification process comprises centrifugation, filtration, and/or chromatography. In some aspects the concentration and/or purification process comprises filtration and chromatography. In some aspects filtration and chromatography are performed in-line with one or more static light scattering devices. In some aspects the solution of viral particles is filtered until a target concentration of the viral vectors is obtained. In some aspects the target concentration may vary based on the amount of virus to be used and the site the virus will be administered (e.g., the tissue type).

Concentration may be measured by a MALS device in total viral particles/mL or by other methods in transducing units (TU)/mL.

In particular aspects, concentration is measured by a MALS device in total viral particles/mL. In one non-limiting example, the target concentration of the viral vectors comprises about $1\times10^6$ to $1\times10^7$ viral particles/mL, about $1\times10^6$ to $1\times10^8$ viral particles/mL, about $1\times10^6$ to $1\times10^9$ viral particles/mL, about $1\times10^7$ to $1\times10^{10}$ viral particles/mL, about $1\times10^8$ to $1\times10^{11}$ viral particles/mL, about $1\times10^8$ to $1\times10^{12}$ viral particles/mL, about $1\times10^{10}$ to $1\times10^{13}$ viral particles/mL, about $1\times10^{10}$ to $1\times10^{14}$ viral particles/mL or about $1\times10^{10}$ to $1\times10^{15}$ viral particles/mL. In some aspects, the target concentration of viral vectors is about $1\times10^8$, $1\times10^9$, $1\times10^{10}$, $1\times10^{11}$, $1\times10^{12}$, $1\times10^{13}$, $1\times10^{14}$, or $1\times10^{15}$ viral particles/mL.

In particular embodiments, concentration is measured in transducing units (TU)/mL.

In one non-limiting example, the target concentration of the viral vectors may have transducing units (TU)/mL of about $1\times10^6$ to $1\times10^7$, about $1\times10^6$ to $1\times10^8$, about $1\times10^6$ to $1\times10^9$, about $1\times10^7$ to $1\times10^{10}$, about $1\times10^8$ to $1\times10^{11}$, about $1\times10^8$ to $1\times10^{12}$, or about $1\times10^{10}$ to $1\times10^{12}$. In some aspects the target concentration of viral vectors may have a TU/mL of $1\times10^8$, $1\times10^9$, $1\times10^{10}$, $1\times10^{11}$, $1\times10^{12}$, or $1\times10^{13}$.

In some aspects a manufacturing process may further comprise performing nucleic acid digestion of a solution of viral particles (e.g., a concentrated and/or purified solution of viral particles). In some aspects a nuclease is used to reduce or eliminate nucleic acids in the solution of viral particles. In some aspects an endonuclease is used to reduce or eliminate nucleic acids in the solution of viral particles. In particular aspects, Bezonase® endonuclease is used to reduce or eliminate nucleic acids in the solution of viral particles.

In some embodiments viral vectors obtained from a manufacturing process are formulated. In some embodiments a formulation of viral vectors is filled.

In certain embodiments disclosed herein are methods for manufacturing viral vectors comprising using a static light scattering device (e.g., a MALS device) in-line with a manufacturing process to control a unit operation in the manufacturing process. In some aspects a single static light scattering device is used to control one or more operation units in the manufacturing process. In some aspects a single static light scattering device is used to control each operation unit. In some aspects a single static light scattering device is used to control multiple operation units. In some aspects an operation unit comprises a separation unit. In some aspects a separation unit is selected from the group consisting of filtration unit, a concentration unit, a clarification unit, a purification unit, a formulation unit, a fill unit, and combinations thereof. In some aspects a separation unit is a tangential flow filtration unit, a normal flow filtration unit, and/or an ultrafiltration unit. In certain aspects a separation unit is a chromatography unit (e.g., ion-exchange chromatography, affinity chromatography, and/or size-exclusion chromatography). In certain aspects an operation unit is a filtration unit (e.g., a tangential flow filtration unit, a normal flow filtration unit, and/or an ultrafiltration unit).

Disclosed herein are methods for detecting viral particles comprising using a static light scattering device (e.g., a MALS device) in-line with a manufacturing process to detect the viral particles produced during the manufacturing process. In some embodiments a static light scattering device is used to detect the viral particles in-line with chromatography and/or filtration during the manufacturing process. In some aspects a static light scattering device is used to detect viral particles in-line with chromatography. In some aspects a MALS device is used to detect viral particles in-line with filtration (e.g., tangential flow filtration, normal filtration, ultrafiltration). In some aspects a first static light scattering device is used to detect viral particles in-line with chromatography and a second static light scattering device is used to detect viral particles in-line with filtration. In some aspects a static light scattering device is used to detect viral particles in-line with chromatography and filtration.

In some embodiments a static light scattering device is used in-line with a manufacturing process to control purification of viral particles. In some aspects a static light scattering device is used in-line with filtration, chromatography, and/or centrifugation to control purification of the viral particles. In some aspects the static light scattering device is used in-line with chromatography to control purification of viral particles. In some aspects a MALS device is used in-line with filtration (e.g., tangential flow filtration, normal filtration, ultrafiltration) to purify viral particles. In some aspects the static light scattering device is used in-line with centrifugation to control purification of viral particles. In some aspects a first static light scattering device is used in-line with chromatography and a second static light scattering device is used in-line with filtration to control purification of the viral particles. In some aspects a first static light scattering device is used in-line with chromatography, a second static light scattering device is used in-line with filtration, and a third static light scattering device is used in-line with centrifugation to control purification of the viral particles. In some aspects a static light scattering device is used in-line with chromatography and filtration and optionally centrifugation to control purification of viral particles.

In some embodiments a static light scattering device controls the separation of viral particles from impurities based on particle size. In some aspects the particle size is measured as the radius or diameter of the particle. A static light scattering device may measure the root-mean-square radius of the viral particles. The root mean square radius value can be used to calculate geometric radius for spherical viral particles. In some aspects the static light scattering device triggers automation of the manufacturing process based on particle size in order to purify the viral particles. For example, viral particles may be automatically separated during manufacture based on their measured size.

Also disclosed herein are viral vector manufacturing processes comprising clarifying viral particles harvested from host cells, separating the viral particles from impurities, filtering the viral particles, and concentrating the viral particles. The manufacturing process comprises one or more static light scattering devices (e.g., one or more MALS devices) in-line with one or more unit operations of the manufacturing process.

In some aspects viral particles are separated from impurities using chromatography and/or filtration in-line with one or more static light scattering devices. In some aspects the viral particles are separated from impurities based on particle size. Particle size may be measured by the one or more static light scattering devices. In some aspects the viral particles are filtered and concentrated using chromatography and/or filtration in-line with one or more static light scattering devices. In certain aspects the viral particles are filtered and concentrated using tangential flow filtration in-line with a static light scattering device. The static light scattering device may determine real-time concentration of the viral particles in solution. In some aspects the static light scattering device triggers automation of the manufacturing process based on concentration of the viral particles in order to stop production when a target concentration is reached.

In some aspects the one or more static light scattering devices are used in-line with separation, filtration, clarification, concentration, purification, and/or formulation processes. In some aspects a static light scattering device is used with each process. In some aspects a static light scattering device is used with one or more processes. In some embodiments the viral vector manufacturing process further comprises formulating the viral particles.

Also disclosed herein are methods for manufacturing viral vectors comprising initiating a viral vector manufacturing process, detecting the presence of viral particles using a static light scattering device (e.g., a MALS device) in-line with the manufacturing process, and purifying the viral particles.

In some aspects the static light scattering device is used in-line with chromatography and/or filtration during the manufacturing process to detect the viral particles. In some aspects the static light scattering device is used in-line with chromatography. In some aspects the static light scattering device is used in-line with filtration (e.g., tangential flow filtration, normal flow filtration, and/or ultrafiltration). In some aspects the static light scattering device is used in-line with chromatography and filtration. In some aspects a first static light scattering device is used in-line with chromatography and a second static light scattering device is used in-line with filtration.

In some embodiments the static light scattering device is used in-line with filtration to control purification of viral particles from impurities based on particle size. Particle size may be measured by the one or more static light scattering devices. In some aspects particle size is measured as the radius or diameter of the particle. In some aspects the filtration process uses multiple filtrations. In some aspects a first filtration is a normal flow filtration and a second filtration is an ultrafiltration. In some aspects a first static light scattering device is used with a first filtration and a second static light scattering device is used with a second filtration. In some aspects a static light scattering device is used with both a first filtration and a second filtration.

In some embodiments a first static light scattering device is used in-line with the manufacturing process to detect the viral particles and a second static light scattering device is used in-line with the manufacturing process to control purification of viral particles. In some embodiments the method further comprises concentrating and/or formulating the viral particles. In some aspects one or more static light scattering devices are used in-line with a concentration process and/or a formulation process.

Disclosed herein are methods for removing impurities in a viral vector manufacturing process comprising separating a solution containing viral particles and impurities using chromatography and/or filtration in-line with a static light scattering device (e.g., a MALS device), wherein the static light scattering device controls separation of viral particles from the impurities based on particle size.

In some aspects a static light scattering device is used in-line with chromatography to control separation of viral particles and impurities. In some aspects a static light scattering device is used in-line with filtration (e.g., tangential flow filtration, normal filtration, ultrafiltration) to control separation of viral particles and impurities. In some aspects a first static light scattering device is used in-line with chromatography and a second static light scattering device is used in-line with filtration to control separation of viral particles and impurities. In some aspects a static light scattering device is used in-line with chromatography and filtration to control separation of viral particles and impurities.

In some embodiments the method further comprises purifying the viral particles. In some aspects a static light scattering device is used in-line with a manufacturing process to detect viral particles and control one or more units operations to purify the viral particles. In some aspects a static light scattering device is used in-line with filtration, chromatography, and/or centrifugation to control purification of viral particles. In some aspects the static light scattering device is used in-line with chromatography to control purification of viral particles. In some aspects a static light scattering device is used in-line with filtration (e.g., tangential flow filtration, normal filtration, ultrafiltration) to control purification of viral particles. In some aspects the static light scattering device is used in-line with centrifugation to control purification of viral particles. In some aspects a first static light scattering device is used in-line with chromatography and a second static light scattering device is used in-line with filtration to control purification of the viral particles. In some aspects a first static light scattering device is used in-line with chromatography, a second static light scattering device is used in-line with filtration, and a third static light scattering device is used in-line with centrifugation to control purification of the viral particles. In some aspects a static light scattering device is used in-line with chromatography and filtration and optionally centrifugation to control purification of viral particles. In some embodiments a static light scattering device is used to control the separation of viral particles from impurities based on particle size.

In some embodiments a first static light scattering device is used in-line with the manufacturing process to control the separation of viral particles and impurities and a second static light scattering device is used in-line with the manufacturing process to control viral particle purification. In some embodiments the method further comprises concentrating and/or formulating the viral particles. In some aspects one or more static light scattering devices are used in-line with a concentration process and/or a formulation process.

Disclosed herein are methods for increasing the recovery of infectious viral particles in a viral vector manufacturing process comprising separating infectious viral particles from impurities in a solution using chromatography and/or filtration in-line with a static light scattering device (e.g., a MALS device). The static light scattering device controls the separation of the infectious viral particles from the impurities based on particle size. In certain aspects, the impurities are non-infectious particles.

In some aspects a static light scattering device is used in-line with chromatography to control separation of infectious viral particles from impurities. In some aspects a static light scattering device is used in-line with filtration (e.g., tangential flow filtration, normal filtration, ultrafiltration) to control separation of infectious viral particles from impurities. In some aspects a first static light scattering device is used in-line with chromatography and a second static light scattering device is used in-line with filtration to control separation of infectious viral particles from impurities. In some aspects a static light scattering device is used in-line with chromatography and filtration to control separation of infectious viral particles from impurities.

In some embodiments the method further comprises concentrating and/or purifying the infectious viral particles. In some aspects a static light scattering device is used in-line with a manufacturing process to control concentration and/or purification of infectious viral particles. In some aspects a static light scattering device is used in-line with filtration, chromatography, and/or centrifugation to control concentration and/or purification of infectious viral particles. In some aspects the static light scattering device is used in-line with chromatography to control concentration and/or purification of infectious viral particles. In some aspects a static light scattering device is used in-line with filtration (e.g., tangential flow filtration, normal filtration, ultrafiltration) to control concentration and/or purification of infectious viral particles. In some aspects the static light scattering device is used in-line with centrifugation to control concentration and/or purification of infectious viral particles. In some aspects a first static light scattering device is used in-line with chromatography and a second static light scattering device is used in-line with filtration to control concentration and/or purification of infectious viral particles. In some aspects a first static light scattering device is used in-line with chromatography, a second static light scattering device is used in-line with filtration, and a third static light scattering device is used in-line with centrifugation to control concentration and/or purification of infectious viral particles. In some aspects a static light scattering device is used in-line with chromatography and filtration and optionally centrifugation to control concentration and/or purification of infectious viral particles. In some embodiments a static light scattering device controls separation of the infectious viral particles from impurities based on particle size.

In some embodiments a static light scattering device is used in-line with filtration to control the purification of infectious viral particles from impurities based on particle size. In some aspects the filtration process uses multiple filtrations. In some aspects a first filtration is a normal flow filtration and a second filtration is an ultrafiltration. In some aspects a first static light scattering device is used with a first filtration and a second static light scattering device is used with a second filtration. In some aspects a static light scattering device is used with both a first filtration and a second filtration.

In some embodiments a first static light scattering device is used in-line with the manufacturing process to control separation of infectious viral particles from the impurities and a second static light scattering device is used in-line with the manufacturing process to control purification of infectious viral particles. In some embodiments the method further comprises formulating the infectious viral particles. In some aspects one or more static light scattering devices are used in-line with a formulation process.

Also disclosed herein are methods for concentrating viral particles in a viral vector manufacturing process comprising filtering a solution comprising viral particles using tangential flow filtration in-line with a static light scattering device (e.g., a MALS device). The static light scattering device may determine the real-time concentration of the viral particles in solution and automate the filtration operation of the solution until the real-time concentration is substantially equal to a target concentration of the viral particles in the solution. In some embodiments the methods further comprise clarifying, purifying, and/or formulating the viral particles.

Also disclosed herein are methods for controlling a unit operation in a viral manufacturing process comprising using a static light scattering device (e.g., a MALS device) in-line with the manufacturing process to detect turbidity in a solution comprising viral particles and thereby control the unit operation.

All publications, patent applications, and issued patents cited in this specification are herein incorporated by reference as if each individual publication, patent application, or issued patent were specifically and individually indicated to be incorporated by reference.

The following examples are provided by way of illustration only and not by way of limitation. Those of skill in the art will readily recognize a variety of noncritical parameters that could be changed or modified in particular embodiments to yield essentially similar results.

EXEMPLIFICATION

A MALS detector is connected in-line with a viral vector manufacturing process unit operation in order to detect, automate, or make decisions based on data obtained during the manufacturing process.

Figure 2:
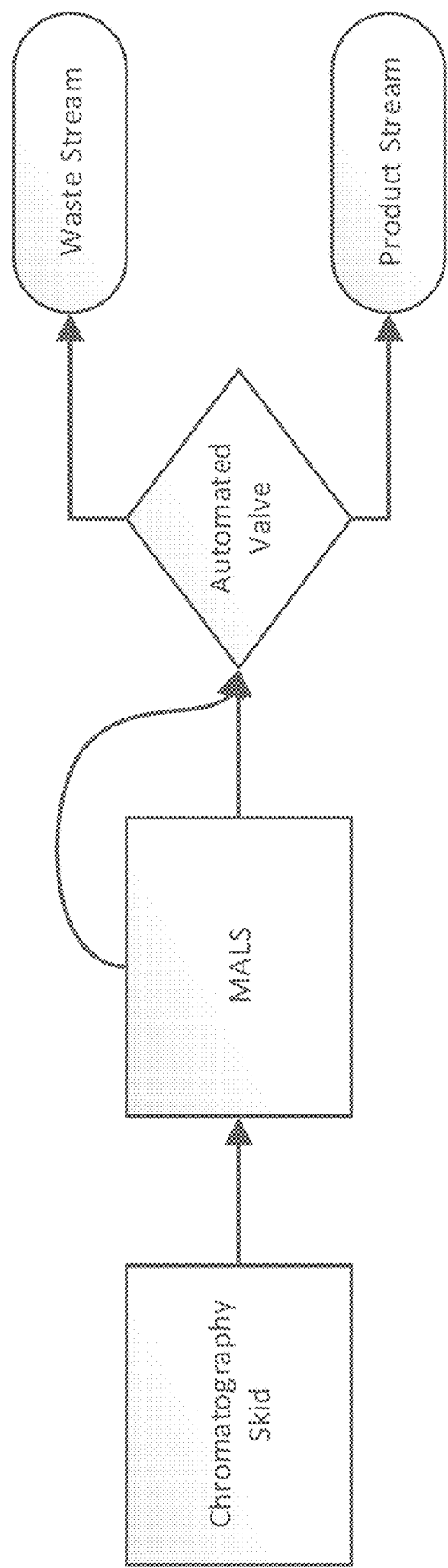
FIG. 2 provides a schematic of using a MALS device in-line with chromatography to assess the presence and size of viral vectors during manufacture.

As shown in FIG. 2, a MALS detector is attached to the effluent of a chromatography skid in order to assess the presence and size of a viral vector passing through it. The information gathered by the MALS detector can be used in-line to automate a downstream valve which can separate particle populations of different average radius, as detected by MALS. Radius is measured by MALS in real time as eluate passes through an in-line flow cell. Multi-angle light scattering can directly measure the root-mean-square radius of particles. Root-mean-square radius is model independent; i.e., it does not assume a specific molecular conformation. This root mean square radius value can be used to calculate geometric radius for spherical particles. There is evidence that some impurities, such as host cell proteins, may be preferentially associated with non-infectious particles with a different radius than infectious particles. Hence purification based on size could allow for a reduction in impurities in the product stream.

Figure 3:
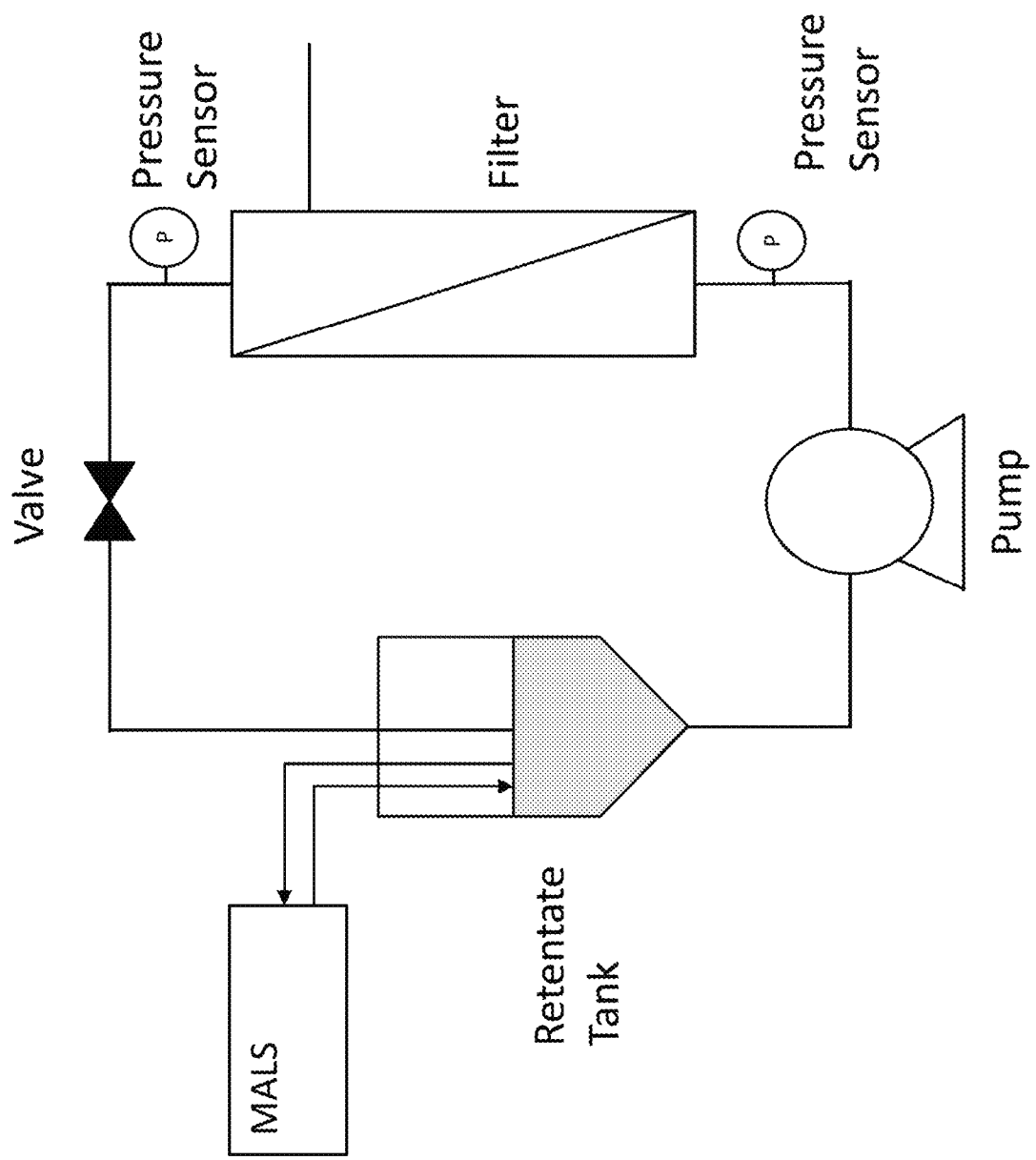
FIG. 3 provides a schematic of using a MALS device in-line with filtration to assess concentration of viral vectors during manufacture.
Figure 4:
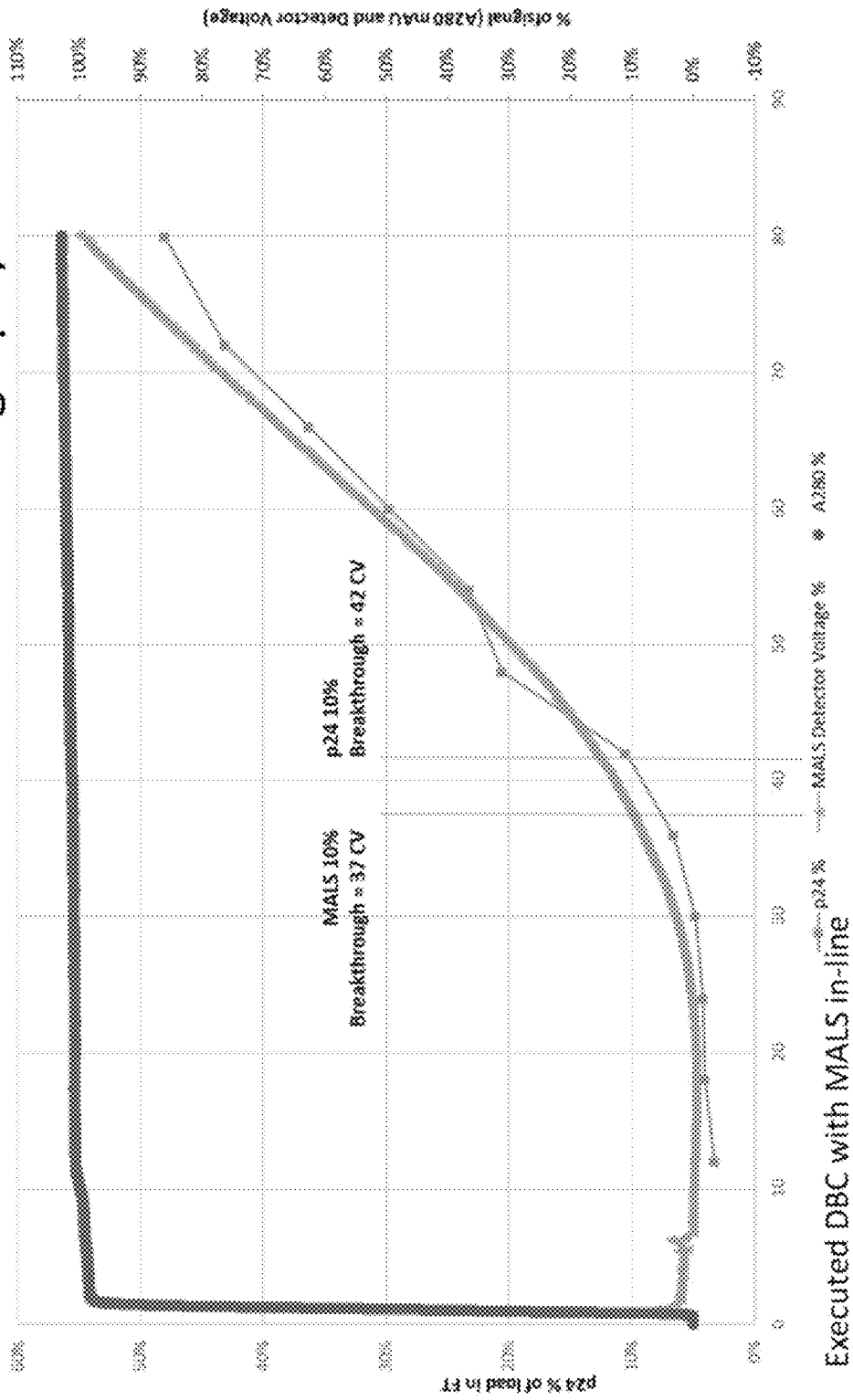
FIG. 4 demonstrates in-line MALS with viral vector chromatography.
Figure 5:
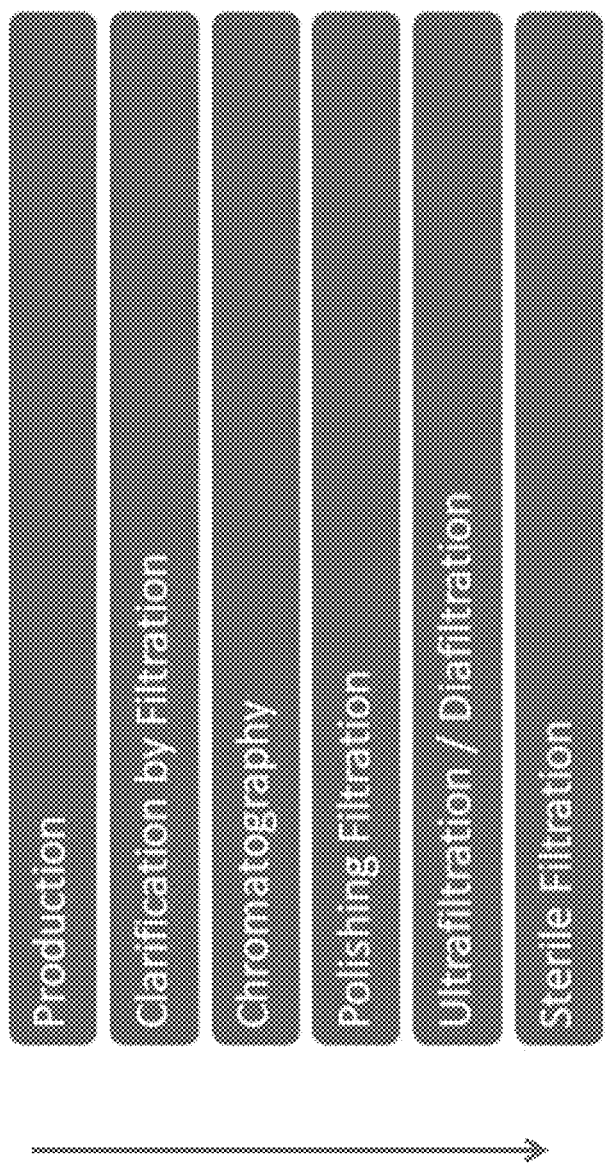
FIG. 5 provides a flow chart of a downstream portion of a viral vector manufacturing process.
Figure 6:
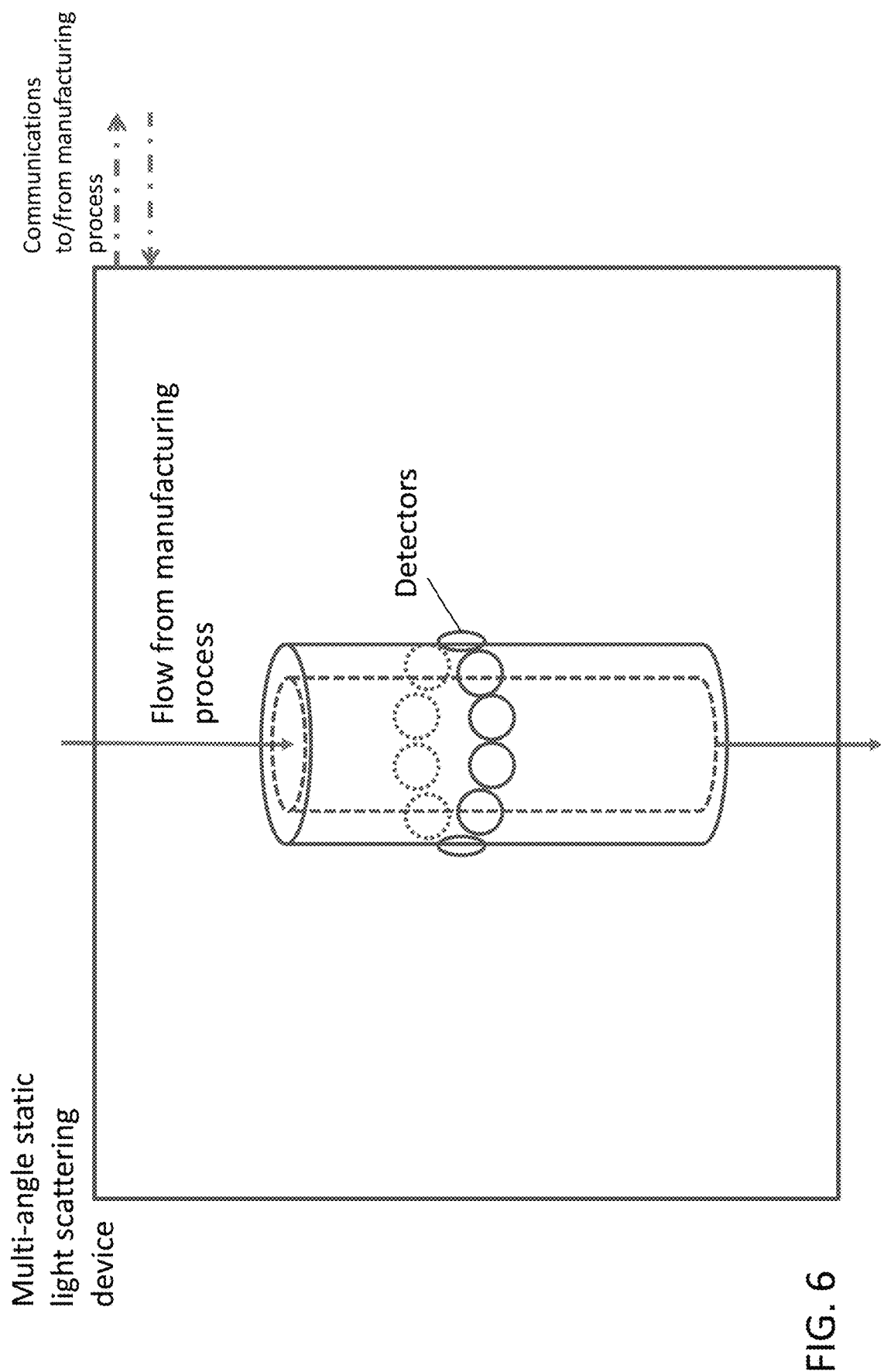
FIG. 6 provides a diagram of a MALS device.

As shown in FIG. 3, a MALS detector is connected in-line to a tangential flow filtration skid in order to assess the concentration of vector particles. This allows for skid automation to stop the unit operation when a specific concentration of vector particles has been met, by shutting off the pump. Particle concentration is determined from the geometric radius, calculated as described above, and the light scattering signal.

In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A method for concentrating viral particles in a viral vector manufacturing process comprising filtering a solution comprising viral particles using tangential flow filtration in-line with a MALS device; wherein the MALS device determines the real-time concentration of the viral particles in solution and automates the filtering of the solution until the real-time concentration is substantially equal to a target concentration of the viral particles in the solution.

2. The method of claim 1, further comprising clarifying the viral particles and/or purifying the viral particles.

3. The method of claim 2, wherein the MALS device is used in-line with a filtration unit to control purification of the viral particles from impurities based on particle size.

4. The method of claim 3, wherein the filtration unit is a normal flow filtration unit.

5. The method of claim 3, wherein a second filtration unit is used in-line with the MALS device, and wherein the second filtration unit is an ultrafiltration unit.

6. The method of claim 2, wherein a first MALS device is used to control concentration of the viral particles and a second MALS device is used to control purification of the viral particles.

7. The method of claim 2, wherein the viral particles are selected from the group consisting of adeno-associated virus (AAV), retrovirus, herpes simplex virus, adenovirus, and vaccinia virus particles.

8. The method of claim 2, wherein the viral particles are lentiviral particles.

* * * * *